O. R. SCHWANTES.
SHOCK ABSORBER.
APPLICATION FILED OCT. 5, 1916.

1,273,677.

Patented July 23, 1918.

Otto R. Schwantes, Inventor

By Richard B. Owen
Attorney

UNITED STATES PATENT OFFICE.

OTTO R. SCHWANTES, OF CLINTONVILLE, WISCONSIN.

SHOCK-ABSORBER.

1,273,677.     Specification of Letters Patent.     Patented July 23, 1918.

Application filed October 5, 1916. Serial No. 123,906.

*To all whom it may concern:*

Be it known that I, OTTO R. SCHWANTES, a citizen of the United States, residing at Clintonville, in the county of Waupaca and State of Wisconsin, have invented certain new and useful Improvements in Shock-Absorbers, of which the following is a specification.

This invention has relation to shock absorbers for motor vehicles, or the like, and the nature and objects thereof will be readily apparent to those skilled in the art to which it apertains in the light of the following explanation of the accompanying drawings illustrating what I now believe to be the preferred embodiment, or mechanical expression, of my invention from among other forms and arrangements within the spirit thereof or the scope of the appended claim.

However, an object of the invention is to provide a shock absorber for motor vehicles, with a view to permitting uninterrupted downward movement of the vehicle body relative to the frame, when the car is jolted over an obstruction in the road bed, or entering a depression therein, but to retard the resulting upward movement of the car body, under the influence of its supporting springs, thereby obviating the shock imparted upon said upward movement and reducing the vibration of the car body.

In addition to the foregoing, my invention comprehends improvements in the details of construction and arrangement of parts to be hereinafter more fully described and particularly set forth in the appended claim.

In the accompanying drawings in which similar and corresponding parts are designated by the same characters of reference throughout the several views in which they appear:

Figure 1:
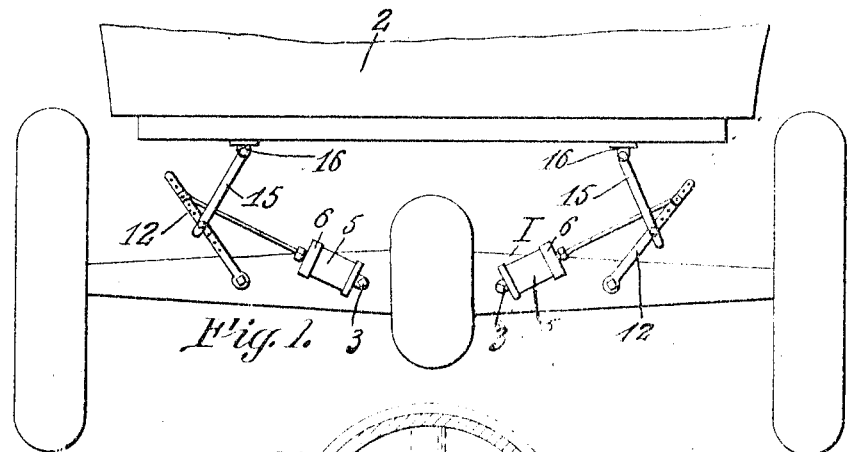
Figure 1, is a view in end elevation of the rear end of a motor vehicle, illustrating the application thereto of my invention.
Figure 4:
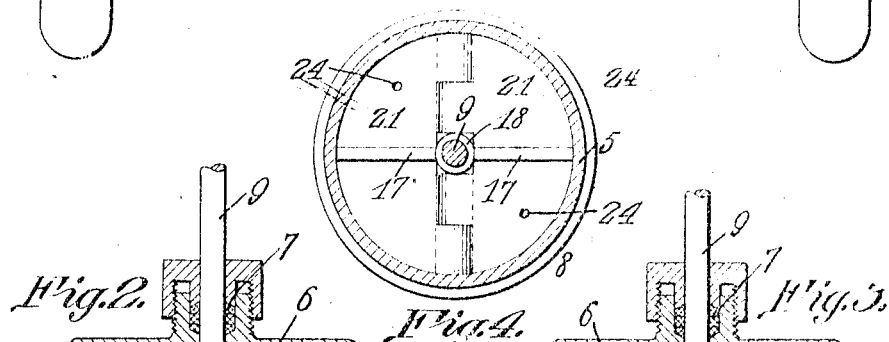
Fig. 4 is a transverse section on the line 4—4 of Fig. 2.

With reference to the drawings 1 indicates the rear axle of a conventional motor vehicle and 2 the car body. A shock absorbing element is preferably located on the axle housing at each side of the differential, and in the present embodiment each element comprises a cylinder 5 having formed integrally therewith at one closed end an ear 3 forming means whereby the element may be pivoted to the axle housing, the opposite end of the cylinder being externally threaded to receive a correspondingly threaded cap 6 provided with a central packing gland 7.

A piston 8 is provided interiorly of each cylinder for vertical reciprocation therein, a piston rod 9 having a lower threaded extension 10 which enters a central opening in said piston. The piston rod 9 passes through the packing gland 7 and is pivotally connected at its upper end to one end of an oscillatable lever 12, pivoted at its other end to the axle housing and extended normally in an upward and outward direction. The intermediate portion of the oscillating lever 12 is connected by means of a vertically and inwardly extending link 15 to a bracket 16, secured to the under side of the car body. The lever 12 is provided with a series of openings 12' whereby the piston rod and link 15 may be adjustably connected thereto.

Figures 2, 3:
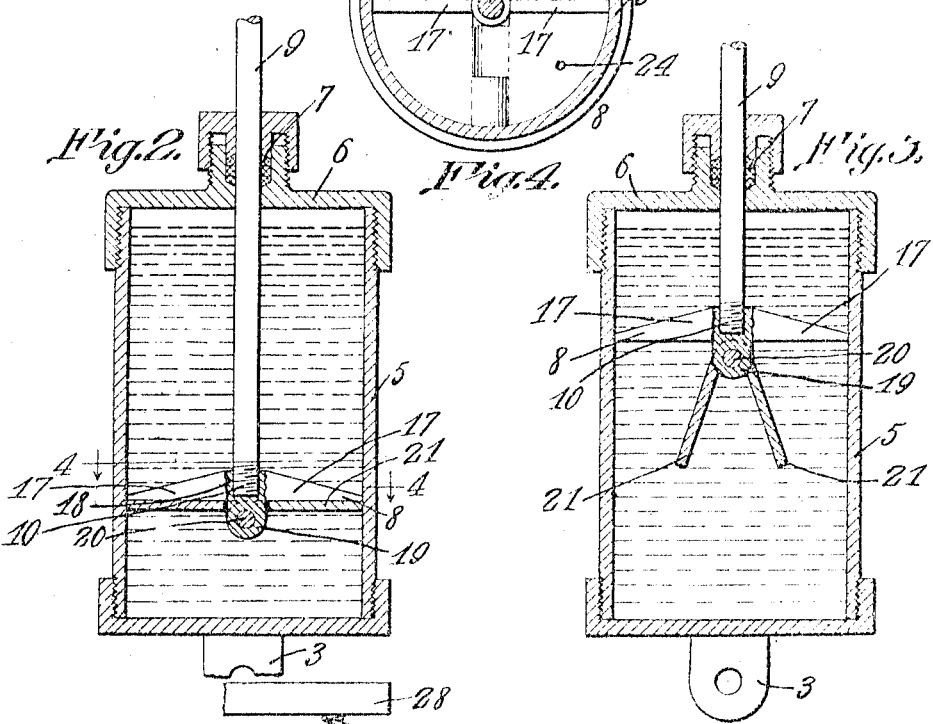
Fig. 2, is a view in one position illustrating a vertical section taken through the cylinder of my improved absorber.
Fig. 3, is a similar view illustrating the parts in a different position.

The piston 8 comprises oppositely directed stop members 17 the central connected portion 18 of which is formed with a threaded opening in which to receive the end of the rod 9. The portion 18 of the piston is further formed with a downwardly directed lug 19, transversely apertured to receive a pintle 20 which projects at each end beyond the lug to hingedly support semicircular leaves 21 which are formed upon their diametrical edges with apertured enlargements to receive the ends of the pintle. When the leaves are in extended position as shown in Fig. 2, they conform to the sides of the cylinder and entirely fill the same, thus providing in effect a piston, the stop members 17 limiting such movement of the leaves. The leaves may furthermore, become disengaged from the sides of the cylinder when in a collapsed position as shown in Fig. 3. The piston is designed to be filled with a fluid such as oil or water.

The details of construction of my invention having been described, the mode of operation may be stated as follows: Prior to a downward movement of the vehicle body the piston will be disposed in the lower portion of the cylinder as illustrated in Fig. 2. Upon the body receiving a downward impulse owing to the entrance of the wheels in a depression in the road bed, the lever 12 will be rocked, thereby moving the piston toward the cap 6. During such movement of the piston, the resistance to the passage of the fluid results in the collapse of the valve leaves 21, thereby permitting the interrupted passage of the fluid past the valve leaves in the piston whereby no resistance will be offered to the outward movement of the piston and consequently the vehicle body will descend freely. Upon the return of the vehicle body to its former position under the influence of its supporting springs, the piston is moved in a downward direction. The passage of the fluid through the conduits of the piston in a reverse direction causes the movement of the valve leaves away from each other, and retarding the downward movement of the piston. The upward movement of the car body is thereby retarded sufficiently to absorb the shock and to permit the return of the car body to its former position in a gradual manner. The valve leaves 21 are provided with constricted apertures 24, for permitting the retarded passage of fluid through the piston conduits by the provision of the links 12 and 15, and the series of openings in 12, different degrees of movement of the piston for the same movement of the vehicle body may be permitted.

It will be obvious that the arrangement of the levers 12 and 15 also acts to resist side sway of the car body and to prevent sudden rebound of the body when subjected to a downward movement at one side.

Figure 5:
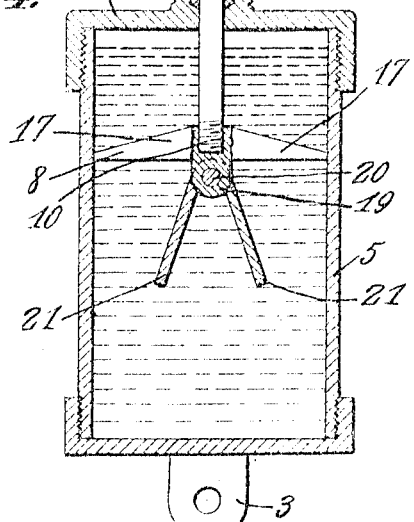
Fig. 5, is a view in elevation of a modified manner of supporting the cylinder of the shock absorber relative to the car body.

In Fig. 5 I have illustrated a modified form of my invention wherein the cylinder is mounted in a reversed position, so as to dispose its piston downward. The piston in this form of invention is provided with a head 25 having a spring disposed between said head and the axle 26 of the vehicle. In a similar manner a spring 27 is disposed between the upper portion of the cylinder and the vehicle body 28. In this form of the invention owing to the reversed position of the cylinder the downward movement of the vehicle body will be retarded, by means of internal mechanism, of the cylinder, while the upward movement of the body will be resisted to some extent by the resistance of the piston, and assisted by means of the springs disposed above and below the cylinders.

Having thus described my invention what I claim as new and desire to secure by Letters Patent is:—

A shock absorber including a cylinder, an apertured lug thereon whereby the cylinder may be pivotally connected to the axle of a motor vehicle; a piston movable in said cylinder, a rod connected to the piston, a lever having one end apertured for connection to the axle housing, said lever having a plurality of longitudinally spaced openings, a bolt connecting the outer end of said rod with one of said openings, a link, a bolt inserted in one end of said link and in one of the perforations of the lever for pivotally connecting the parts together, and means for pivotally connecting the opposite end of the link to the vehicle body.

In testimony whereof I affix my signature in presence of two witnesses.

OTTO R. SCHWANTES.

Witnesses:
C. E. GIBSON,
NORMAN HANSEN.